United States Patent
Yang et al.

(10) Patent No.: US 11,314,457 B2
(45) Date of Patent: Apr. 26, 2022

(54) DATA PROCESSING METHOD FOR DATA FORMAT CONVERSION, APPARATUS, DEVICE, AND SYSTEM, STORAGE MEDIUM, AND PROGRAM PRODUCT

(71) Applicant: Beijing Sensetime Technology Development Co., Ltd., Beijing (CN)

(72) Inventors: Tao Yang, Beijing (CN); Qingzheng Li, Beijing (CN)

(73) Assignee: Beijing Sensetime Technology Development Co., Ltd., Beijing (CN)

(*) Notice: Subject to any disclaimer, the term of this patent is extended or adjusted under 35 U.S.C. 154(b) by 0 days.

(21) Appl. No.: 17/097,971

(22) Filed: Nov. 13, 2020

(65) Prior Publication Data
US 2021/0200474 A1    Jul. 1, 2021

Related U.S. Application Data

(63) Continuation of application No. PCT/CN2020/098173, filed on Jun. 24, 2020.

(30) Foreign Application Priority Data

Dec. 27, 2019    (CN) .......................... 201911379730.6

(51) Int. Cl.
*G06F 3/06*    (2006.01)
*G06N 3/04*    (2006.01)

(52) U.S. Cl.
CPC .......... *G06F 3/0659* (2013.01); *G06F 3/0604* (2013.01); *G06F 3/0652* (2013.01);
(Continued)

(58) Field of Classification Search
CPC .... G06F 3/0604; G06F 3/0626; G06F 3/0652; G06F 3/0658; G06F 3/0659; G06F 3/0661; G06F 3/0673; G06F 3/0679; G06N 3/04
See application file for complete search history.

(56) References Cited

U.S. PATENT DOCUMENTS

| 5,961,629 A | 10/1999 | Nguyen et al. |
| 8,407,245 B2 | 3/2013 | Ryan et al. |

(Continued)

FOREIGN PATENT DOCUMENTS

| CN | 103226532 A | 7/2013 |
| CN | 105573922 A | 5/2016 |

(Continued)

OTHER PUBLICATIONS

State Intellectual Property Office of the People's Republic of China, Office Action and Search Report Issued in Application No. 201911379730.6, dated Oct. 9, 2021, 17 pages.

(Continued)

*Primary Examiner* — Larry T Mackall

(57) ABSTRACT

Data processing methods, data processing apparatuses, and storage media are provided. The method is applicable to a data processing system. The data processing system includes a storage device and a programmable device. Data is transmitted between the storage device and the programmable device via a bus. A controller and an accelerator are deployed on the programmable device. The controller is enabled with at least two kinds of data format conversion function. The method includes: the controller obtaining the first data; the controller performing data format conversion on the first data to obtain second target data in a target data format; and the controller storing the second data to the storage device and/or sending the second data to the accelerator.

14 Claims, 6 Drawing Sheets

(52) U.S. Cl.
CPC .......... *G06F 3/0658* (2013.01); *G06F 3/0679* (2013.01); *G06N 3/04* (2013.01)

(56) References Cited

U.S. PATENT DOCUMENTS

| | | | |
|---|---|---|---|
| 2015/0120673 A1* | 4/2015 | Rolfe | G06F 11/1471 707/674 |
| 2017/0103299 A1* | 4/2017 | Aydonat | G06N 3/063 |
| 2018/0373760 A1* | 12/2018 | Verma | G06F 16/24569 |

FOREIGN PATENT DOCUMENTS

| | | | |
|---|---|---|---|
| CN | 106294234 A | | 1/2017 |
| CN | 108363737 A | | 8/2018 |
| CN | 109032704 A | | 12/2018 |
| CN | 109274697 A | | 1/2019 |
| CN | 110309088 A | | 10/2019 |
| CN | 110515589 A | | 11/2019 |
| CN | 111176725 A | | 5/2020 |

OTHER PUBLICATIONS

Ke Liu, "Research and implementation of man-machine interaction control in video format conversion chip", China Excellent Master's Thesis Full-text Database Information Technology Series, Apr. 15, 2009, 84 pages. [English Abstract].

* cited by examiner

DATA PROCESSING METHOD FOR DATA FORMAT CONVERSION, APPARATUS, DEVICE, AND SYSTEM, STORAGE MEDIUM, AND PROGRAM PRODUCT

CROSS REFERENCE TO RELATED APPLICATIONS

This application is a continuation of International Application No. PCT/CN2020/098173, filed on Jun. 24, 2020, which claims priority to Chinese Patent Application No. 201911379730.6 entitled "DATA PROCESSING METHOD, APPARATUS, AND DEVICE, AND STORAGE MEDIUM" filed on Dec. 27, 2019, all of which are incorporated herein by reference in their entireties.

TECHNICAL FIELD

The present disclosure relates to the field of computer technology, and in particular, to data processing methods, apparatuses, devices, and systems, storage media, and program products.

BACKGROUND

In a data processing task, a controller is often used to perform a data format conversion process on data.

As one controller is enabled with one kind of data format conversion function, different controllers are used to perform multiple kinds of data format conversion processing when they are required. Therefore, a data processing system is usually to be provided with multiple different controllers.

SUMMARY

The present disclosure provides a data processing technical solution.

In a first aspect, examples of the present disclosure provide a data processing method. The method is applicable to a data processing system. The data processing system includes a storage device and a programmable device which transmit data to each other via a bus, and a controller and an accelerator are deployed on the programmable device. The controller is enabled with at least two kinds of data format conversion function. The method includes: obtaining, by the controller, first data; performing, by the controller, data format conversion on the first data to obtain second data in a target data format; and storing, by the controller, the second data into the storage device and/or sending, by the controller, the second data to the accelerator.

In a second aspect, the present disclosure provides a data processing apparatus. The apparatus includes a storage device and a programmable device, and data is transmitted between the storage device and the programmable device via a bus. The programmable device is deployed with a controller and an accelerator, and the controller is enabled with at least two kinds of data format conversion function, where the controller is configured to: obtain first data; perform data format conversion on the first data to obtain second data in a target data format; and store the second data to the storage device and/or send the second data to the accelerator.

In a third aspect, the present disclosure provides a data processing device, including: a processor, a storage device, and a computer program; where the computer program is stored in the storage device and is configured to be executed by the processor to implement the data processing method described in the first aspect.

In a fourth aspect, the present disclosure provides a machine-readable storage medium storing programmable device codes, where the codes are executed by a controller to implement the data processing method described in the first aspect.

In a fifth aspect, the present disclosure provides a data processing apparatus. The apparatus includes a storage device and a programmable device, and data is transmitted between the storage device and the programmable device via a bus. The programmable device is deployed with a controller and an accelerator, and the controller is enabled with at least two kinds of data format conversion function. The controller includes: an obtaining unit configured to obtain first data; a first processing unit configured to perform data format conversion on the first data to obtain second data in a target data format; and a second processing unit configured to store the second data to the storage device and/or send the second data to the accelerator In a sixth aspect, the present disclosure provides a data processing system. The system includes a storage device and a programmable device, and data is transmitted between the storage device and the programmable device via a bus. The programmable device is deployed with a controller and an accelerator, and the controller is enabled with at least two kinds of data format conversion function. The controller is configured to: obtain first data; perform data format conversion on the first data to obtain second data in a target data format; and store the second data to the storage device and/or send the second data to the accelerator.

In a seventh aspect, the present disclosure provides a computer program product including machine executable instructions that, when read and executed by a computer, cause the computer to implement the data processing method described in the first aspect.

The present disclosure provides a data processing method, a data processing apparatus, a data processing device, a data processing system, a storage medium, and a computer product. The method is applicable to a data processing system. The data processing system includes a storage device and a programmable device which transmit data to each other via a bus, and a controller and an accelerator are deployed on the programmable device. The controller is enabled with at least two kinds of data format conversion function. The method includes the following. The controller obtains first data. The controller performs data format conversion on the first data to obtain second data in a target data format. The controller stores the second data to the storage device, and/or, the controller sends the second data to the accelerator. The method can realize multiple kinds of data format conversion processing, has data conversion integration function, can effectively improve efficiency of data format conversion, and effectively enhance processing efficiency of data processing.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
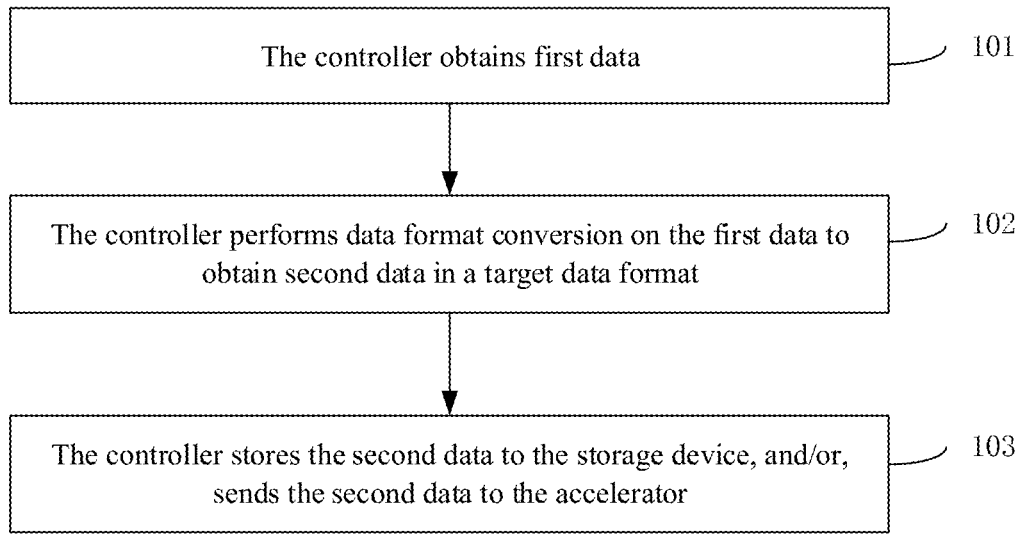
FIG. 1 is a schematic flowchart of a data processing method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The following first explains the terms involved in this application.

Data format: refers to a format in which data is stored in a file or a record.

Bus: refers to a common communication trunk line for transmitting information between various functional components of a computer. It can be transmission wiring harness composed of wires. Depending on different types of information transmitted by the computer, computer buses can be divided into a data bus, an address bus and a control bus respectively for transmitting data, data addresses and control signals.

Bit width of a bus: refers to a number of bits of binary data that the bus can transmit simultaneously.

Fixed-point number: refers to a number in which a position of a decimal point in the number is fixed, and usually includes a fixed-point integer and a fixed-point decimal or a fixed-point fraction. After choosing the position of the decimal point, all numbers in the operation should be unified as fixed-point integers or fixed-point decimals, and the position of the decimal point is no longer considered in the operation.

Floating-point number: refers to a number in which a position of a decimal point of the number is not fixed, and is represented by an exponent and a mantissa. Usually the mantissa is a pure decimal, the exponent is an integer, and both the mantissa and the exponent are signed numbers. The sign of the mantissa indicates the positive or negative sign of the number, and the sign of the exponent indicates the actual position of the decimal point.

DMA: Direct Memory Access, refers to a mechanism for fast data transfer. When using DMA for data access, a DMA controller controls the transfer of DMA data while a CPU (Central Processing Unit) may not be required for controlling, thereby improving efficiency of a system in executing applications.

OpenCV: Open source Computer Vision library, refers to a cross-platform computer vision library based on BSD (Berkeley Software Distribution) license (open source).

AXI: Advanced eXtensible Interface, refers to a bus protocol for high performance, high bandwidth, and low latency.

AMBA: Advanced Microcontroller Bus Architecture, defines a communication standard for high-performance embedded microcontrollers.

IP core: Intellectual Property core, according to the hardware description level implementation of an IP core, includes a soft IP core, a hard IP core and a firm IP core.

FIFO buffer: First Input First Output, refers to a first-in first-out dual-port buffer, that is, data first entering into the buffer, is first to be output.

ARM processor: Advanced RISC Machine, refers to a low-power and low-cost RISC (Reduced Instruction Set Computing) microprocessor.

An application scenario of the present disclosure can be a data processing system. The data processing system can include a storage device and a programmable device. Data is transmitted between the storage device and the programmable device via a bus, and a controller and an accelerator are deployed on the programmable device. When using the data processing system for data processing, the accelerator can perform different ways of calculation on the data. As the calculation ways are different, and data formats required by the accelerator are different. At this time, the controller performs a corresponding format conversion process on the data. For example, in a deep learning algorithm based on an AMBA bus, before codes, which have been processed by a CPU or Caffe (Convolutional Architecture for Fast Feature Embedding) based on a neural network framework, are further calculated by the accelerator, the codes have to be subject to a format conversion process by the controller. For another example, in a deep learning algorithm, before a feature map output from an IP core is further calculated by the accelerator, the feature map has to be subject to a format conversion process by the controller. For still another example, pictures processed by an OpenCV are stored in a Double Data Rate Synchronous Dynamic Random Access Memory (DDR SDRAM, abbreviated as DDR), and before the pictures processed by the OpenCV are further calculated by the accelerator, the pictures processed by the OpenCV are directly obtained from the DDR through an AXI-MM bus to be subjected to a format conversion process by the controller.

The present disclosure provides a data processing method, a data processing apparatus, a data processing device, and a storage medium.

FIG. 1 is a schematic flowchart of a data processing method according to an example of the present disclosure. The method is applicable to a data processing system. The data processing system includes a storage device and a programmable device, and data is transmitted between the storage device and the programmable device via a bus. A controller and an accelerator are deployed on the programmable device. The controller is enabled with at least two kinds of data format conversion function. As shown in FIG. 1, the method includes the following steps.

At step 101, the controller obtains first data.

In this example, the data processing system includes a storage device and a programmable device which transmit data to each other via a bus. The storage device stores raw data to be processed by the programmable device, and/or stores intermediate data processed by the programmable device, and/or stores final data processed by the programmable device. The programmable device includes an accelerator and a controller. The accelerator is configured to perform calculation on data in different ways. For example, codes processed by a CPU or Caffe are calculated by the accelerator, a feature map output by an IP core is calculated by the accelerator, or a picture processed by an OpenCV is calculated by the accelerator. In a process of the accelerator calculating data in different ways, data formats required by the accelerator are different. Therefore, before inputting the data into the accelerator for calculating, the data has to be subject to a format conversion process by the controller based on a data format required by the accelerator.

The controller obtaining the first data includes that the controller obtains the first data from the accelerator, and/or the controller obtains the first data from the storage device. For example, after the accelerator performs calculation on the data, the controller can acquire the data processed by the accelerator as the first data to perform the data format conversion process. For another example, the controller can directly acquire data from the storage device as the first data, so as to perform data format conversion process.

At step 102, the controller performs data format conversion on the first data to obtain second data in a target data format.

In this example, when the accelerator performs calculation in different ways, the data formats required by the accelerator are different. The data format required by the accelerator is the target data format to be processed by the controller for data format conversion. The controller performs a data format conversion process on the obtained first data based on the data format required by the accelerator, and obtains the second data conforming to the target data format. The data formats required by the accelerator can be different data formats, and the controller is enabled with multiple kinds of data format conversion function. Therefore, based on the target data format required by the accelerator, the second data conforming to the target data format can be obtained. As an example, the target data format can include as following: a width of a data line is the same as a bit width of the bus; when the width of the data line is the same as the bit width of the bus, a data calculation format adopts a 32-bit floating-point number; and data in the same line is data in continuous RGB (Red Green Blue) format, etc.

At step 103, the controller stores the second data to the storage device, and/or, the controller sends the second data to the accelerator.

In this example, the data processing system may further include an ARM processor, and the ARM processor performs data transmission with the storage device and the programmable device via the bus. After the controller performs the data format conversion process on the data and obtains the second data in the target data format, the controller may store the second data to the storage device, and the ARM processor directly obtains the second data from the storage device for corresponding processing, and the accelerator can also directly obtain the second data from the storage device to perform calculation. In addition, the controller may also directly send the second data in the target data format to the accelerator, such that the accelerator can directly perform calculation on the second data after receiving the second data in the target data format. Generally, one controller is enabled with one kind of data format conversion function. In the case that it is necessary to perform multiple kinds of data conversion processing on the data, the data output from the accelerator or data obtained from the storage device is to be switched to multiple controllers for respective data format conversion processing. The controller in the examples of the present disclosure is enabled with multiple kinds of data conversion function, and the controller can perform multiple kinds of data format conversion processing to obtain the second data that fulfills different target data formats, thus, the data processing system can deploy with one controller having the function of multiple kinds of data format conversion to implement multi-functional integrated data conversion processing. The data processing system provided by the present disclosure has a simple structure and superior data processing performance, and can meet the dual requirements of the data processing system for both data accessing speed and diversified data formats.

The data processing method disclosed in the example is applicable to a data processing system. The data processing system includes a storage device and a programmable device. Data is transmitted between the storage device and the programmable device via a bus. The programmable device deploys a controller and an accelerator. The controller is enabled with at least two kinds of data format conversion function. The method includes the following. The controller obtains first data; the controller performs data format conversion on the first data to obtain second data in a target data format; the controller stores the second data to the storage device, and/or, the controller sends the second data to the accelerator. When data format conversion processing for different kinds are required, the data processing system have to integrate multiple controllers where each controller is enabled with only one single kind of data format conversion function, while the controller in this example is enabled with multiple kinds of data format conversion function, has data conversion integration function, thereby saving resources consumed by frequently switching to different controllers for data format conversion, improving efficiency of data format conversion, and helping to enhance processing efficiency of data processing.

Figure 2:
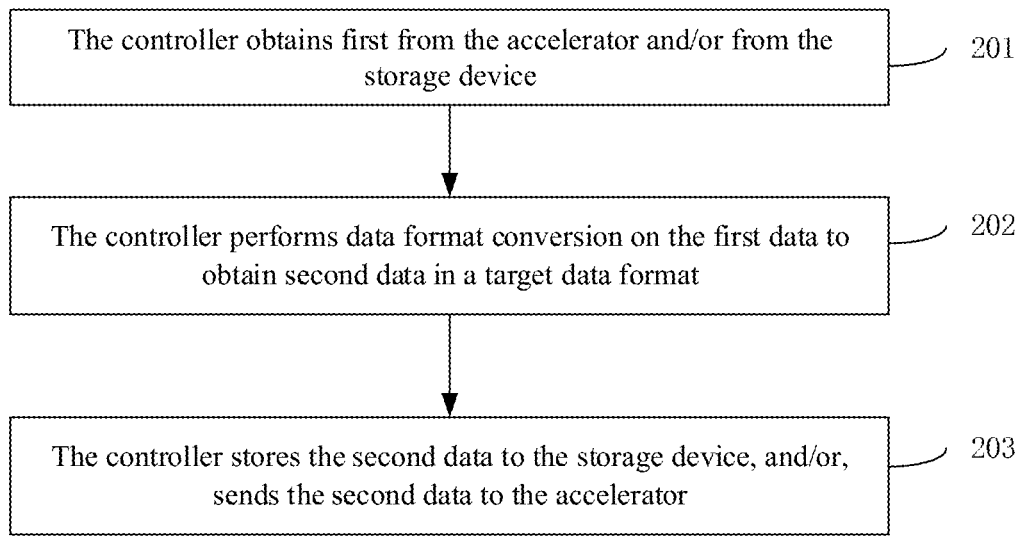
FIG. 2 is a schematic flowchart of a data processing method according to another example of the present disclosure.

FIG. 2 is a schematic flowchart of a data processing method according to another example of the present disclosure. The method is applicable to a data processing system. The data processing system includes a storage device and a programmable device, and data is transmitted between the storage device and the programmable device via a bus. A controller and an accelerator are deployed on the programmable device. The controller is enabled with at least two kinds of data format conversion function. As shown in FIG. 2, the method includes the following steps.

At step 201, the controller obtains first data from the accelerator and/or from the storage device.

In this example, for this step, reference can be made to step 101 in FIG. 1, and details are not repeated here.

At step 202, the controller performs data format conversion on the first data to obtain second data in a target data format.

In an implementation, the first data may include a plurality of first data lines, and step 202 may include: deleting, by the controller, blank data from each of the plurality of first data lines, to obtain a plurality of second data lines corresponding to the plurality of first data lines respectively; performing, by the controller, a splicing process on the plurality of second data lines to obtain first target data, and determining the first target data as the second data, where the first target data includes at least one third data line, and a line width of each third data line is the same as the bit width of the bus.

When the controller is used to perform a format conversion process on the first data, the data format conversion process is performed on the first data based on the requirement of the target data format. The data format conversion process includes the followings. The first data is input into a first buffer of the controller, and blank data in each first data line is deleted in the first buffer, where one or more first data lines form the first data, thus, a plurality of first data lines in the first data are converted into a plurality of continuous second data lines, and each second data line has a correspondence with each first data line. Then, the plurality of second data lines are input into a second buffer of the controller, and in the second buffer, the plurality of second data lines are performed a splicing process to obtain the first target data. The first target data is determined as the second data. The line width of each third data line in the second data is the same as the bit width of the bus, where meaning of the line width of each third data line being the same as the bit width of the bus includes that the number of data bits included in each third data line is the same as the maximum number of bits that can be transferred in parallel in the bus.

Figure 2A:
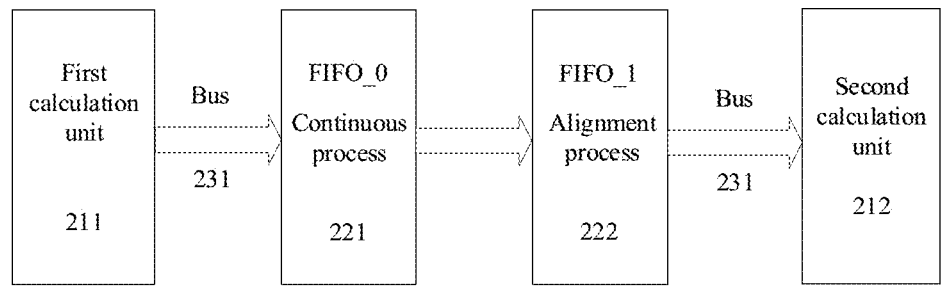
FIG. 2A is a schematic diagram of a format conversion process provided by this example.
Figure 2B:
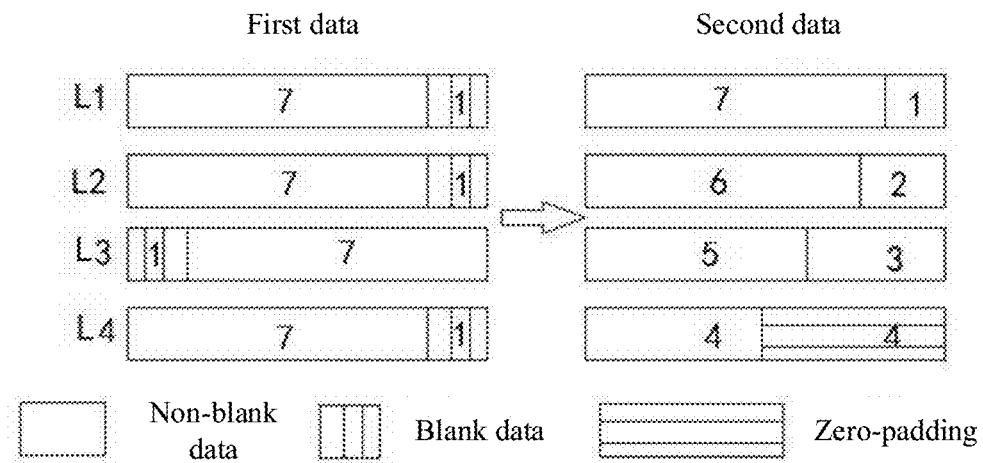
FIG. 2B is a schematic diagram of data before and after format conversion in the format conversion process of FIG. 2A.

As an example, FIG. 2A is a schematic diagram of a format conversion process provided in this example, and FIG. 2B is a schematic diagram of data before and after format conversion in the format conversion process of FIG. 2A. As shown in FIG. 2A, the controller obtains first data from a first calculation unit 211 of the accelerator through an AXI bus 231. The first calculation unit 211 refers to a calculation unit in the accelerator that implements a previous calculation operation on the data. As shown in FIG. 2B, the first data includes four first data lines, respectively L1, L2, L3, L4, and each first data line includes 8 pieces of data. In each first data line, the 8 pieces of data includes one piece of blank data. Each piece of data is 8 bits, and the AXI bus is 64 bits which can accommodate 8 pieces of data. According to requirement of the target format, the first data is subjected to the following format conversion process. First, each first data line is input into a first buffer 221 FIFO_0 for continuous process, specifically, the four first data lines in the first data are processed to delete the blank data respectively, so as to obtain four second data lines, where the four second data lines correspond to the four first data lines respectively, and each second data line includes 7 pieces of data. Then, the four second data lines are spliced, that is, the four second data lines are input into a second buffer 222 FIFO_1 for an alignment process to obtain the first target data, and the first target data is taken as the second data. Then the second data is transmitted to a second calculation unit 212 of the accelerator. The second calculation unit 212 refers to a calculation unit in the accelerator that implements a subsequent calculation process on the data. The second buffer 222 FIFO_1 and the AXI bus 231 have the same bit width (both are 64 bits), and a width of each data line of the second data is the same as a bit width of the AXI bus 231. If a data amount in the last data line is less than a data amount corresponding to the bit width of the AXI bus, the last data line can be filled with zero-padding to make the line width of the last data line the same as the bit width of the AXI bus. In this way, the line width of all data lines of the second data is the same as the bit width of the AXI bus.

In an implementation, after obtaining the plurality of second data lines respectively corresponding to the plurality of first data lines, the method further includes: performing, by the controller and for each of the plurality of second data lines, operation format conversion on data in the second data line to obtain a fourth data line corresponding to the second data line; performing, by the controller, a splicing process on a plurality of fourth data lines to obtain second target data; and determining the second target data as the second data, where the second target data includes at least one fifth data line, and a line width of each fifth data line is the same as the bit width of the bus.

After deleting the blank data from each first data line of the first data to obtain each second data line which corresponds to each first data line, each second data line is input into a third buffer, and in the third buffer of the controller, each piece of data in the second data line, that is, non-blank data, is subjected to an operation format conversion process, to convert the non-blank data from the current operation format to a preset operation format, that is, to perform an operation format conversion process on each piece of second data, to obtain the corresponding one or more fourth data lines. As an example, non-blank data can be converted from an 8-bit fixed-point number to a 64-bit floating-point number. The plurality of fourth data lines are spliced to obtain the second target data, and the second target data is taken as the second data, where the second target data includes at least one fifth data line, and the line width of each fifth data line is the same as the bit width of the bus.

Figure 2C:
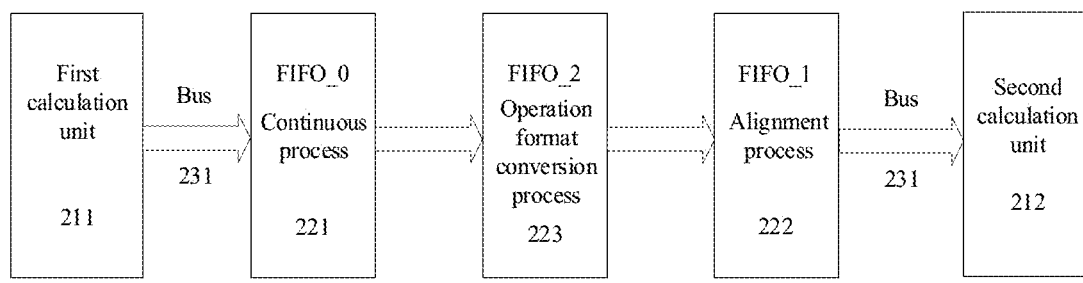
FIG. 2C is a schematic diagram of another format conversion process provided by this example.

As an example, FIG. 2C is a schematic diagram of another format conversion process provided by this example. On the basis of FIG. 2A, after the continuous process for the first data is completed, the processed data is input into a third buffer 223 FIFO_2 to be performed with the operation format conversion process. Then the data after the operation format conversion process is input into the second buffer 222 FIFO_1 for an alignment process.

The data in any of the first buffer, the second buffer and the third buffer of the controller can be directly output as data after a data format conversion process, and the data can be directly output to the accelerator or to the storage device. Data output from the first buffer of the controller is data obtained by performing the blank data deletion process on the first data. Data output from the third buffer of the controller is data obtained by performing both the blank data deletion process and operation format conversion process on the first data. Data output from the second buffer of the controller is the second target data, that is data obtained by performing the blank data deletion process, operation format conversion process, and alignment process on the first data.

In an implementation, the first data includes data of q types, and the controller performing the data format conversion on the first data to obtain the second data in the target data format includes: grouping, by the controller, data of the same type in the first data into a first sub-data set, to obtain q first sub-data sets respectively corresponding to the q types; and determining the q first sub-data sets as the second data, where each of the first sub-data sets includes one or more first sub-data lines, a line width of each first sub-data line is the same as the bit width of the bus, and q is a positive integer greater than or equal to 1.

The first data can include p sixth data lines, where one sixth data line may include data of various types, or may include data of only one type. The first data is input into a fourth buffer of the controller. When a sixth data line includes data of multiple types, such as data of q types, one or more data of the same type in the six data line are grouped into a second sub-data line, and one six data line is converted to multiple second sub-data lines, such as q lines of second sub-data lines. When a sixth data line includes data of one type, a second sub-data line corresponding to the six data line is the same as the six data line. After obtaining one or more second sub-data lines corresponding to each six data line, the one or more second sub-data lines are respectively input into a fifth buffer of the controller. Second sub-data of the same type are subjected to performing an aligning process in the fifth buffer of the controller, and first sub-data of such type is obtained. The second data includes first sub-data of q types, each of the first sub-data sets in the second data includes data of the same type, and the line width of each first sub-data line is the same as the bit width of the bus.

Figure 2D:
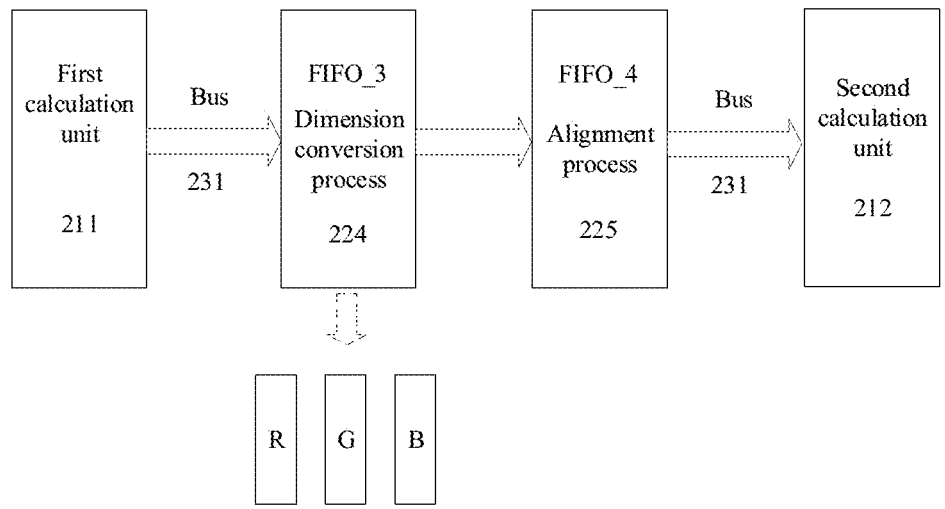
FIG. 2D is a schematic diagram of still another format conversion process provided by this example.
Figure 2E:
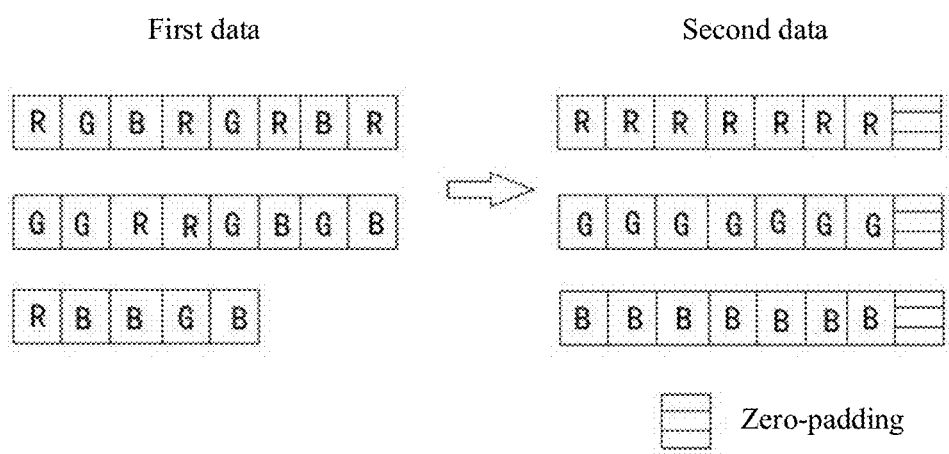
FIG. 2E is a schematic diagram of data before and after format conversion in the format conversion process of FIG. 2D.

As an example, FIG. 2D is a schematic diagram of still another format conversion process provided by this example, and FIG. 2E is a schematic diagram of data before and after format conversion in the format conversion process of FIG. 2D. As shown in FIGS. 2D and 2E, the first data obtained from the first calculation unit 211 of the accelerator through the AXI bus 231 includes p sixth data lines, and a sixth data line can include three types, R (Red), G (Green), and B (Blue), of data. Specifically, as shown in FIG. 2E, the first data includes a total of 7 pieces of R data, 7 pieces of G data, and 7 pieces of B data, each piece of data has a size of 8 bits. The AXI bus can accommodate 64 bits data, therefore, the AXI bus can hold up to 8 pieces of data at most, so these pieces of data are carried in 3 sixth data lines. The first data is input into a fourth buffer 224 FIFO_3 of the controller, and one or more data of the same type in a sixth data line are grouped into one second sub-data line. Thus, each sixth data line is converted into three second sub-data lines, and each second sub-data line of the three second sub-data line includes R data, G data or B data. Taking FIG. 2E as an example, three second sub-data lines converted from a first sixth line includes 4 pieces of R data, 2 pieces of G data, and 2 pieces of B data respectively; three second sub-data lines converted from a second sixth line includes 2 pieces of R data, 4 pieces of G data, and 2 pieces of B data respectively; and three second sub-data lines converted from a third sixth line includes 1 piece of R data, 1 piece of G data, and 3 pieces of B data respectively. After obtaining a number of second sub-data lines corresponding to each sixth data line, where the number is less than or equal to q, all of the second sub-data lines are input into a fifth buffer 225 FIFO_4 of the controller for an alignment process to obtain the second data. Taking FIG. 2E as an example, the 9 second sub-data lines obtained previously are input to the fifth buffer 225 FIFO_4 of the controller to perform the alignment process on the same type of data, that is, perform the alignment process respectively on R data, G data, and B data, to obtain 3 first sub-data sets which are taken as the second data, and the 3 first sub-data sets respectively correspond to R data, G data and B data. In this example, each of the first sub-data sets may include a first sub-data line. If a data amount in the first sub-data line is less than a data amount corresponding to the bit width of the AXI bus, the sub-data line can be filled by zero-padding. Then the second data is transmitted to the second calculation unit 212 of the accelerator. Since the fifth buffer 225 FIFO_4 has the same bit width as the AXI bus 231 (both are 64 bits), the width of each first sub-data line of the second data is the same as the bit width of the AXI bus.

Optionally, after the first sub-data corresponding to each type is obtained, each first sub-data line in the first sub-data is performed with mean subtraction. As an example, an empirical value is subtracted from data in each of the first sub-data sets, where a first sub-data set corresponds to data of one type. By subtracting a mean value for each first sub-data line, common content of each first sub-data line can be removed, and distinct content of each first sub-data line can be enhanced. In a process of image preprocessing in deep learning, normalization of sample images can be implemented by the mean subtraction.

In an implementation, the first data includes a plurality of first data columns, where the plurality of first data columns are arranged horizontally in sequence; and the controller performing data format conversion on the first data, to obtain the second data in the target data format includes: vertically splicing each of the plurality of first data columns based on an order in which the plurality of first data columns are arranged horizontally, and determining the data obtained by the vertical splicing as the second data.

The first data obtained by the controller from the accelerator or the storage device includes a plurality of first data columns arranged horizontally, and the controller performing a format conversion process on the plurality of obtained first data columns, includes the following. The plurality of first data columns arranged horizontally are input into a sixth buffer of the controller, and in the sixth buffer of the controller, the plurality of first data columns arranged horizontally are converted into one second data column spliced vertically, thus, the second data is obtained. An order in which the second data column spliced vertically from top to bottom is the same as the order in which the plurality of first data columns are arranged horizontally from left to right. Optionally, after obtaining one vertical spliced second data column, a continuous process and an alignment process are further performed on each data line in the vertical spliced second data column to obtain the second data. For the continuous process and alignment process, reference can be made to the above-mentioned process, which will not be repeated here.

Figure 2F:
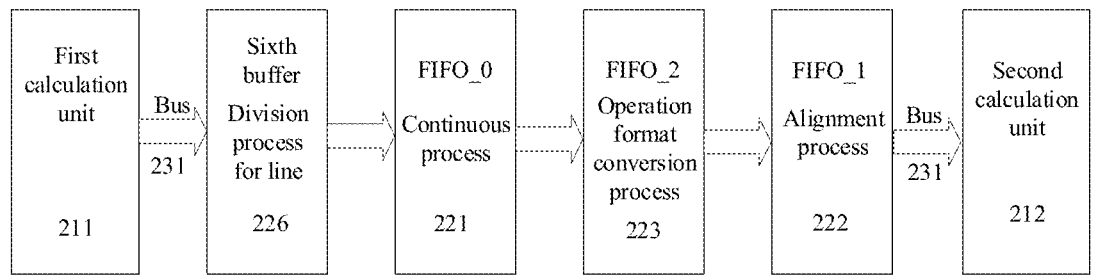
FIG. 2F is a schematic diagram of yet another format conversion process provided by this example.
Figure 2G:
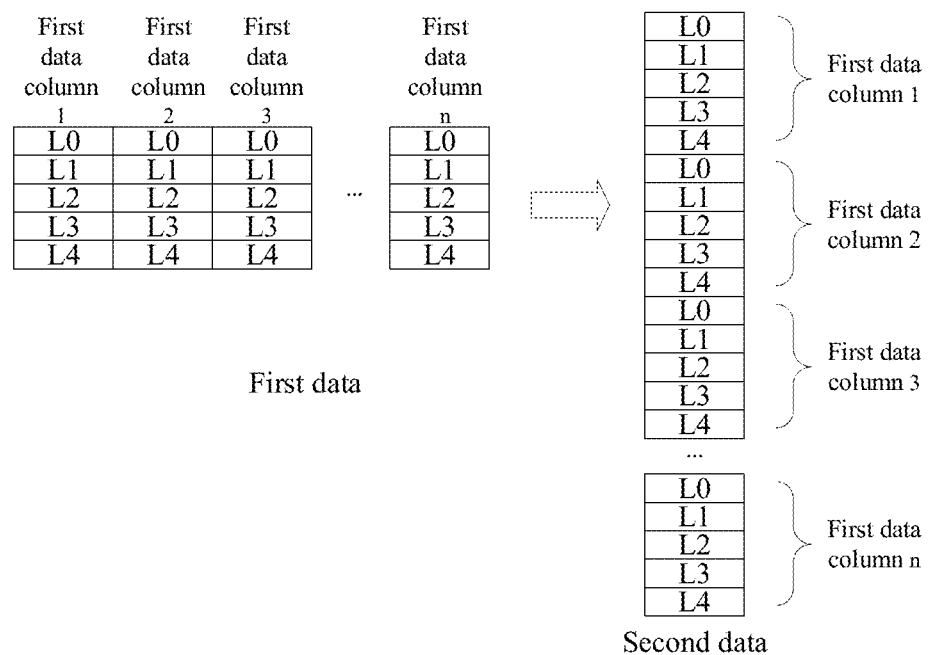
FIG. 2G is a schematic diagram of data before and after format conversion in the format conversion process of FIG. 2F.

As an example, FIG. 2F is a schematic diagram of yet another format conversion process provided by this example, and FIG. 2G is a schematic diagram of data before and after format conversion in the format conversion process of FIG. 2F. As shown in FIGS. 2F and 2G, the obtained n first data columns are arranged horizontally, where n is an integer greater than 1, and an order of the horizontal arrangement may be a number sequence of the first data columns. The n first data columns arranged horizontally are input into a sixth buffer 226 of the controller for a data format conversion process. As shown in FIG. 2G, the horizontally arranged n first data columns are converted into one second data column spliced vertically. An order in which the second data column spliced vertically from top to bottom is the same as an order in which the n first data columns are arranged horizontally from left to right before the data format conversion process. The manner in which the n first data columns are arranged horizontally includes that data lines with the same line sequence in the n first data columns are arranged horizontally. The manner in which the second data column spliced vertically includes that each data line in the i-th first data column is arranged in sequence, and then all data lines in the (i+1)-th first data column are spliced with the i-th first data column, where $1 \leq i \leq n-1$. For the remaining steps, reference can be made to the previous descriptions of FIG. 2A and FIG. 2C, and details will not be repeated here. In addition, it should be noted that the present disclosure does not limit the number of n. Although an input to the sixth buffer 226 is at bit width of the bus, preprocessing for line spicing may be performed in the sixth buffer 226, such that a bit width processed internally in the sixth buffer 226 can be larger than the bit width of the bus, for example, may be 2 times, 4 times, etc., the bit width of the bus.

In the above example, although taking the buffer being a FIFO buffer as an example, those skilled in the art will know that other types of memories can also be used to accomplish similar function, such as a block RAM in an FPGA (Field Programmable Gate Array), which is not limited by the present disclosure.

Since a space for format conversion in the controller is limited, or the data processing tasks are different, data required for a data conversion process is different. The method in this example may further include that the controller obtains multi-channel data and selects at least part of data from the multi-channel data as the first data. Specifically, from the obtained M channels of first data, N channels of first data are selected for the format conversion process, where M and N are positive integers not less than 1, and M≤N, that is, a part of first data is selected from the obtained multi-channel first data to perform the format conversion process, while a remaining part of first data is buffered and waited for the format conversion process.

Optionally, when performing a format conversion process on a large amount of data, to further improve the processing efficiency of the data format conversion process, the method of this example may adopt a ping-pong buffer manner. While the data format conversion process is performing in a first unit of the controller, data is buffered in a second unit of the controller to prepare for the data format conversion process. After the amount of data buffered in the second unit satisfies a requirement of the data format conversion process, when the data format conversion process in the first unit is completed, the second unit is used for data format conversion process, and the first unit is used for data buffering. Division of the first unit and the second unit is based on an amount of data to be converted data format and a data amount required by the data format conversion process. This design can effectively improve efficiency of the data format conversion process while effectively reducing a performance requirement on a format conversion unit.

At step 203, the controller stores the second data to the storage device, and/or, the controller sends the second data to the accelerator.

In this example, specifically, after obtaining the second data in the target format, the controller may send the second data to the accelerator for a subsequent calculation process, and/or store the second data in the storage device for buffering or allowing another processor to obtain the second data from the storage device for other processing. As an example, the controller obtains a feature map output by the accelerator, and after the format conversion process is performed on the feature map, the second data acquired by the format conversion process is stored in the storage device, such that another processor can access the second data from the storage device to perform subsequent data processing.

Optionally, in the examples of the present disclosure the controller includes a DMA controller, the storage device includes a DDR SDRAM, the programmable device includes an FPGA, and the accelerator includes a CNN (Convolutional Neural Network) accelerator.

The data format conversion process method provided by the examples is applicable to diversified fields, such as unmanned driving, security monitoring, intelligent video analysis, and the like, which need to perform different data processing on data in multiple data formats.

The method of this example is applicable to a data processing system. The data processing system includes a storage device and a programmable device which transmit data to each other via a bus. The programmable device deploys a controller and an accelerator. The controller is enabled with at least two kinds of data format conversion function. The method includes: obtaining, by the controller, first data from the accelerator and/or from the storage device; performing, by the controller, data format conversion on the first data to obtain second data in a target data format; and storing, by the controller, the second data to the storage device and/or sending, by the controller, the second data to the accelerator. The method of this example is enabled with multiple kinds of data format conversion processing, has data conversion integration function, can effectively reduce time consumption of data format processing, and improve efficiency of the data format conversion process. The method of this example implements seamless switching among multiple kinds of data format conversion processing with the same common bus, which is beneficial to reducing resource consumption of the data conversion process. Thus, it is unnecessary to design different controllers for the different data format conversion processing, which can effectively avoid a case that the same data format conversion process repeatedly occupies different controllers. Using the same controller to perform data conversion process in multiple formats for at least one channel of the first data can have high data conversion processing efficiency. While meeting a requirement of multiple data formats for data processing, the method is beneficial to improve processing efficiency and performance of data processing.

Figure 3:
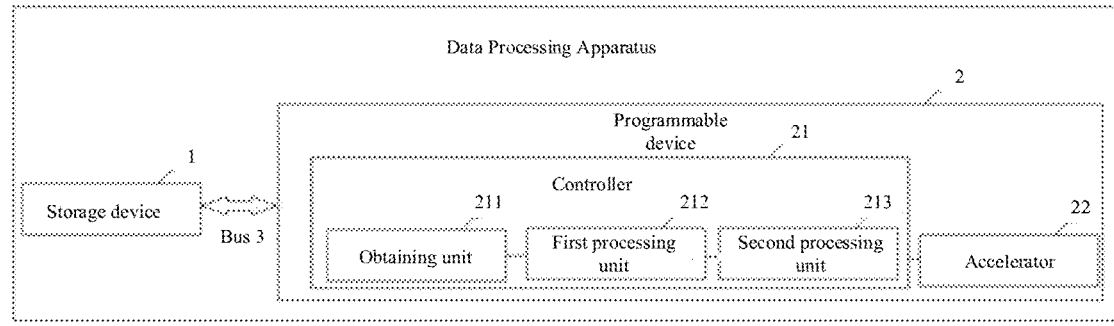
FIG. 3 is a schematic structural diagram of a data processing apparatus according to an example of the present disclosure.

FIG. 3 is a schematic structural diagram of a data processing apparatus according to an example of the present disclosure. As shown in FIG. 3, the apparatus includes: a storage device 1 and a programmable device 2, and data is transmitted between the storage device 1 and the programmable device 2 via a bus 3. A controller 21 and an accelerator 22 are deployed on the programmable device 2. The controller is enabled with at least two kinds of data format conversion function.

The controller 21 includes: an obtaining unit 211 configured to obtain first data; a first processing unit 212 configured to perform data format conversion on the first data to obtain second data in a target data format; and a second processing unit 213 configured to store the second data to the storage device and/or send the second data to the accelerator.

The data processing apparatus disclosed in this example includes a storage device and a programmable device which transmit data to each other via a bus. A controller and an accelerator are deployed on the programmable device. The controller is enabled with at least two kinds of data format conversion function. The controller is configured to obtain first data; perform data format conversion on the first data to obtain second data in a target data format; and store the second data to the storage device and/or send the second data to the accelerator. When different kinds of data format conversion process are required, multiple controllers that each is enabled with only one single kind of data format conversion function have to be integrated in the data processing system, while the controller in this example is enabled with multiple kinds of data format conversion function, has data conversion integration function. Since it is unnecessary to frequently switch among different controllers for data format conversion, efficiency of data format conversion can be improved which helps to enhance processing efficiency of data processing.

Figure 4:
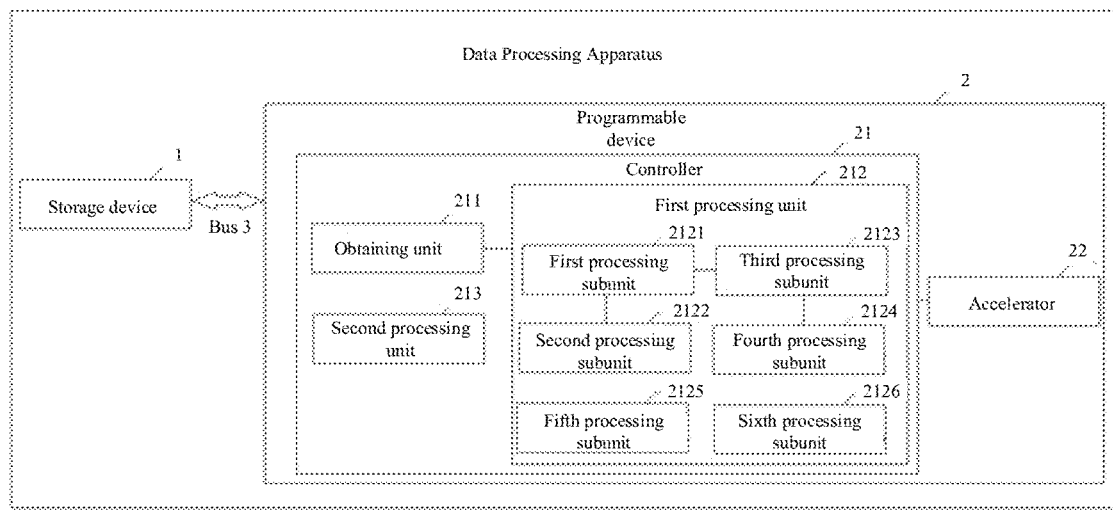
FIG. 4 is a schematic structural diagram of a data processing apparatus according to another example of the present disclosure.

FIG. 4 is a schematic structural diagram of a data processing apparatus according to another example of the present disclosure. Based on the example shown in FIG. 3, as shown in FIG. 4, the obtaining unit 211 is configured to obtain the first data from the accelerator and/or obtain the first data from the storage device.

In an example, the first data includes a plurality of first data lines. The first processing unit 212 includes: a first processing subunit 2121 configured to delete blank data from each of the plurality of first data lines to obtain a plurality of second data lines respectively corresponding to the plurality of first data lines; and a second processing subunit 2122 configured to perform a splicing process on the plurality of second data lines to obtain first target data as the second data, where the first target data includes at least one third data line, and a line width of each third data line is the same as a bit width of the bus.

In an example, the first processing unit 212 further includes: a third processing subunit 2123 configured to, after the plurality of second data lines respectively corresponding to the plurality of first data lines are obtained, perform, for each of the plurality of second data lines, operation format conversion on data in the second data line to obtain a fourth data line corresponding to the second data line; and a fourth processing subunit 2124 configured to perform a splicing process on a plurality of fourth data lines to obtain second target data as the second data, wherein the second target data comprises at least one fifth data line, and a line width of each fifth data line is the same as the bit width of the bus.

In an example, the first data includes data of q types, and the first processing unit 212 further includes: a fifth processing subunit 2125 configured to group data of the same type in the first data into a first sub-data set, to obtain q first sub-data sets respectively corresponding to the q types; and determine the q first sub-data sets as the second data, where each of the first sub-data sets comprises one or more first sub-data lines, a line width of each of the first sub-data lines is the same as a bit width of the bus, and q is a positive integer greater than or equal to 1.

In an example, the first data includes a plurality of first data columns, the plurality of first data columns are arranged horizontally in sequence; and the first processing unit 212 further includes: a sixth processing subunit 2126 configured to vertically splice each of the plurality of first data columns based on an order in which the plurality of first data columns are arranged horizontally; and determine data obtained by the vertically splicing as the second data.

In an example, the obtaining unit 211 is further configured to obtain multi-channel data; and select at least part of data from the multi-channel data as the first data.

In an example, the controller includes a DMA controller, the storage device includes a DDR, the programmable device includes an FPGA, and the accelerator includes a CNN accelerator.

The data processing apparatus disclosed in this example includes a storage device and a programmable device which transmit data to each other via a bus. A controller and an accelerator are deployed on the programmable device, the controller is enabled with at least two kinds of data format conversion function; where the controller is configured to obtain first data from the accelerator and/or from the storage device; perform data format conversion on the first data to obtain second data in a target data format; store the second data to the storage device and/or send the second data to the accelerator. The apparatus of this example is enabled with multiple kinds of data format conversion processing, has data conversion integration function, can effectively reduce time consumption of data format processing, and improve efficiency of the data format conversion process. The apparatus of this example implements seamless switching among multiple kinds of data format conversion processing with the same common bus, which is beneficial to reducing resource consumption of the data conversion process. Thus, it is unnecessary to design different controllers for the different data format conversion processing, which can effectively avoid a case that the same data format conversion process repeatedly occupies different controllers. Using the same controller to perform data conversion process in multiple formats for at least one channel of the first data can have high data conversion processing efficiency. While meeting a requirement of multiple data formats for data processing, the apparatus is beneficial to improve processing efficiency and performance of data processing.

Figure 5:
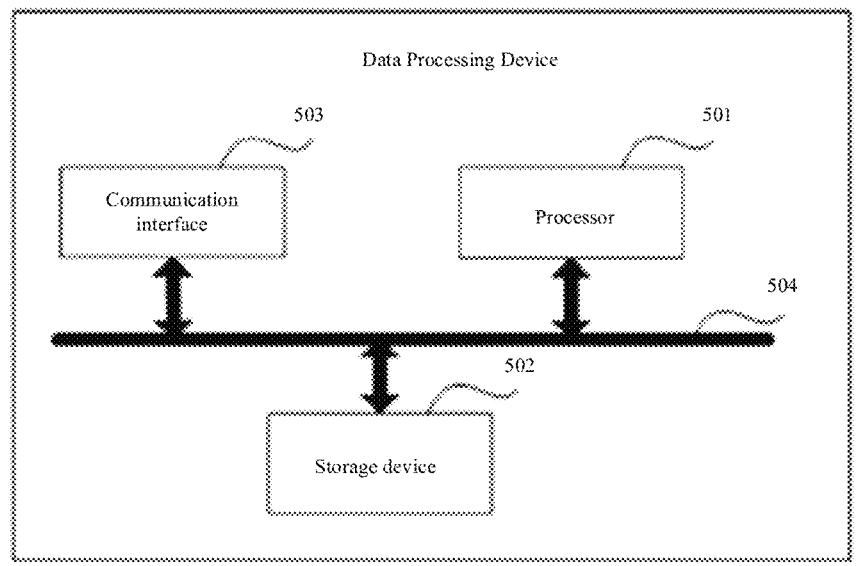
FIG. 5 is a schematic structural diagram of a data processing device according to an example of the present disclosure.

FIG. 5 is a schematic structural diagram of a data processing device according to an example of the present disclosure. As shown in FIG. 5, examples of the present disclosure provide a data processing device that can be used to execute the actions or steps of the data processing method in the examples shown in FIGS. 1-2, and the device includes: a processor 501, a storage device 502, and a communication interface 503.

The storage device 502 is configured to store a computer program. The processor 501 is configured to execute a computer program stored in the storage device 502 to implement the operation of the data processing apparatus in the examples shown in FIGS. 1-4, and details will not be repeated here.

Optionally, the data processing device can further include a bus 504. The processor 501, the storage device 502, and the communication interface 503 can be connected to each other via the bus 504. The bus 504 can be a Peripheral Component Interconnect (PCI) bus, an Extended Industry Standard Architecture (EISA) bus, or the like. The bus 504 can be divided into an address bus, a data bus, a control bus, and so on. For ease of representation, only a thick line is shown in FIG. 5, but it does not mean that there is only one bus or one type of bus.

In the examples of the present disclosure, the above examples can refer to each other for reference, and the same or similar steps and nouns are not repeated one by one.

Alternatively, part or all of the above units can also be implemented in an integrated circuit in a chip of the device. Also, they can be implemented separately or integrated together. That is, the above units can be configured as one or more integrated circuits implementing the above method, for example, one or more specific integrated circuits (e.g., Application Specific Integrated Circuit, ASIC), or one or more microprocessors (e.g., Digital Signal Processor, DSP), or, one or more FPGAs.

Figure 6:
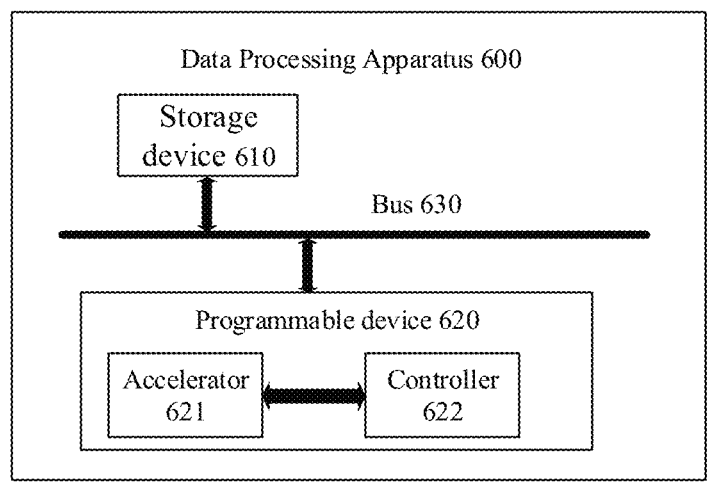
FIG. 6 is a schematic diagram of a hardware structure of a data processing apparatus according to an example of the present disclosure.

FIG. 6 is a schematic diagram of a hardware structure of a data processing apparatus according to an example of the present disclosure. As shown in FIG. 6, examples of the present disclosure provide a data processing apparatus 600, including: a storage device 610 and a programmable device 620. Data is transmitted between the storage device 610 and the programmable device 620 via a bus 630. A controller 622 and an accelerator 621 are deployed on the programmable device 620. The controller 622 is enabled with at least two kinds of data format conversion function. The controller 622 is configured to: obtain first data; perform data format conversion on the first data to obtain second data in a target data format; and store the second data to the storage device and/or send the second data to the accelerator.

In an example, the controller obtains the first data from the accelerator; and/or the controller obtains the first data from the storage device.

In an example, the first data includes a plurality of first data lines. The controller includes: a first sub-controller configured to delete blank data from each of the plurality of first data lines to obtain a plurality of second data lines respectively corresponding to the plurality of first data lines; and a second sub-controller configured to perform a splicing process on the plurality of second data lines to obtain first target data as the second data, wherein the first target data comprises at least one third data line, and a line width of each third data line is the same as a bit width of the bus.

In an example, the controller includes: a third sub-controller configured to, after the plurality of second data lines respectively corresponding to the plurality of first data lines are obtained and for each of the plurality of second data lines, perform operation format conversion on data in the second data line to obtain a fourth data line corresponding to the second data line; and a fourth sub-controller configured to perform a splicing process on a plurality of fourth data lines to obtain second target data as the second data, wherein the second target data comprises at least one fifth data line, and a line width of each fifth data line is the same as the bit width of the bus.

In an example, the first data includes data of q types, and the controller includes: a fifth sub-controller configured to group data of a same type in the first data into a first sub-data set, to obtain q first sub-data sets respectively corresponding to the q types; and determine the q first sub-data sets as the second data; wherein each of the first sub-data sets comprises one or more first sub-data lines, a line width of each of the first sub-data lines is the same as a bit width of the bus, and q is a positive integer greater than or equal to 1.

In an example, the first data includes a plurality of first data columns, the plurality of first data columns are arranged horizontally in sequence, and the controller further includes: a sixth sub-controller configured to vertically splice each of the plurality of first data columns based on an order in which the plurality of first data columns are arranged horizontally; and determine data obtained by the vertically splicing as the second data.

In an example, the controller is further configured to obtain multi-channel data; and select at least part of data from the multi-channel data as the first data.

In an example, the controller includes a DMA controller, the storage device includes a DDR, the programmable device includes an FPGA, and the accelerator includes a CNN accelerator. It should be understood that the controller and the accelerator can be implemented in programming languages specifically designed for circuit design on programmable devices, such as Verilog, VHDL (Very-High-Speed Integrated Circuit Hardware Description Language), etc., combined with a flip-flop, a memory, a gate circuit built-in the programmable devices. The implementation of each sub-controller in the controller is similar to that of the controller.

The present disclosure also provides a data processing system, the data processing system includes a storage device and a programmable device which transmit data to each other via a bus. A controller and an accelerator are deployed on the programmable device, the controller is enabled with at least two kinds of data format conversion function; where the controller is configured to obtain first data; perform data format conversion on the first data to obtain second data in a target data format; and store the second data to the storage device and/or send the second data to the accelerator.

The present disclosure also provides a machine-readable storage medium on which programmable device codes are stored, and the programmable device codes are executed by a processor to implement the above processing method. The machine-readable storage medium can be a non-volatile machine-readable storage medium.

In the above examples, it can be implemented in whole or in part by software, hardware, firmware, or any combination thereof. When implemented in software, it can be implemented in whole or in part in the form of a computer program product. The computer program product includes one or more computer instructions. When computer program instructions are loaded and executed on a computer, the processes or function according to the examples of the present disclosure are generated in whole or in part. The computer can be a general-purpose computer, a dedicated computer, a computer network, or other programmable devices. Computer instructions can be stored in a computer-readable storage medium or transmitted from one computer-readable storage medium to another computer-readable storage medium, for example, the computer instructions can be transmitted from a website site, a computer, a trajectory prediction device or a data center via wire (For example, coaxial cable, optical fiber, digital subscriber line (DSL)) or wireless (for example, infrared, wireless, microwave, etc.) to another website, a computer, a trajectory prediction device, or a data center. The computer-readable storage medium can be any available medium that can be accessed by a computer or a data storage device including one or more available devices, data centers, and the like. Usable media can be magnetic media (e.g., floppy disk, hard disk, magnetic tape), optical media (e.g., DVD), or semiconductor media (e.g., solid state disk (SSD)), and so on.

Those skilled in the art should be appreciated that in one or more of the above examples, the function described in the examples of the present disclosure can be implemented by hardware, software, firmware, or any combination thereof. When implemented in software, these function can be stored in a computer-readable medium or transmitted as one or more instructions or codes on a computer-readable medium. Computer-readable media includes computer storage media and communication media, where communication media includes any medium that facilitates transfer of a computer program from one place to another. The storage medium can be any available medium that can be accessed by a general-purpose or special-purpose computer.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

The invention claimed is:

1. A data processing method, being applicable to a data processing system, the data processing system comprising a storage device and a programmable device which transmit data to each other via a bus, the programmable device being deployed with a controller and an accelerator, the controller being enabled with at least two kinds of data format conversion function, and the method comprising:
  obtaining, by the controller, first data, wherein the first data comprises at least one of: a plurality of first data lines, data of q types, or a plurality of first data columns arranged horizontally in sequence;
  performing, by the controller, data format conversion on the first data to obtain second data in a target data format; and
  storing, by the controller, the second data into the storage device and/or sending, by the controller, the second data to the accelerator;
  wherein performing, by the controller, the data format conversion on the first data to obtain the second data in the target data format comprises:
    when the first data comprises the plurality of first data lines, deleting blank data from each of the plurality of first data lines to obtain a plurality of second data lines respectively corresponding to the plurality of first data lines; and performing, by the controller, a splicing process on the plurality of second data lines to obtain first target data as the second data, wherein the first target data comprises at least one third data line, and a line width of each third data line is the same as a bit width of the bus;
    when the first data comprises the data of q types, grouping, by the controller, data of a same type in the first data into a first sub-data set, to obtain q first sub-data sets respectively corresponding to the q types; and determining the q first sub-data sets as the second data; wherein each of the first sub-data sets comprises one or more first sub-data lines, a line width of each of the first sub-data lines is the same as a bit width of the bus, and q is a positive integer greater than or equal to 1; or
    when the first data comprises the plurality of first data columns and the plurality of first data columns are arranged horizontally in sequence, vertically splicing each of the plurality of first data columns based on an order in which the plurality of first data columns are arranged horizontally; and determining data obtained by the vertically splicing as the second data.

2. The method according to claim 1, wherein obtaining, by the controller, the first data comprises:
  obtaining, by the controller, the first data from the accelerator; and/or
  obtaining, by the controller, the first data from the storage device.

3. The method according to claim 1, wherein after obtaining the plurality of second data lines respectively corresponding to the plurality of first data lines, further comprising:
  performing, by the controller and for each of the plurality of second data lines, operation format conversion on data in the second data line to obtain a fourth data line corresponding to the second data line; and
  performing, by the controller, a splicing process on a plurality of fourth data lines to obtain second target data as the second data, wherein the second target data comprises at least one fifth data line, and a line width of each fifth data line is the same as the bit width of the bus.

4. The method according to claim 1, wherein obtaining, by the controller, the first data comprising:
  obtaining, by the controller, multi-channel data; and
  selecting at least part of data from the multi-channel data as the first data.

5. The method according to claim 1, wherein the controller comprises a direct memory access (DMA) controller.

6. The method according to claim 1, wherein
  the storage device comprises a double data rate synchronous dynamic random access memory (DDR SDRAM),
  the programmable device comprises a field programmable gate array (FPGA), and
  the accelerator comprises a convolutional neural network (CNN) accelerator.

7. A non-transitory machine-readable storage medium storing programmable device codes, wherein the codes are executed by a controller to implement the method according to claim 1.

8. A data processing apparatus, comprising a storage device and a programmable device which transmit data to each other via a bus, the programmable device being deployed with a controller and an accelerator, and the controller being enabled with at least two kinds of data format conversion function, wherein the controller is configured to:
  obtain first data, wherein the first data comprises at least one of: a plurality of first data lines, data of q types, or a plurality of first data columns arranged horizontally in sequence;
  perform data format conversion on the first data to obtain second data in a target data format; and
  store the second data to the storage device and/or send the second data to the accelerator;
  when the first data comprises the plurality of first data lines, the controller comprises:
    a first sub-controller configured to delete blank data from each of the plurality of first data lines to obtain a plurality of second data lines respectively corresponding to the plurality of first data lines; and
    a second sub-controller configured to perform a splicing process on the plurality of second data lines to obtain first target data as the second data, wherein the first target data comprises at least one third data line, and a line width of each third data line is the same as a bit width of the bus;
  when the first data comprises the data of q types, the controller comprises:
    a fifth sub-controller configured to group data of a same type in the first data into a first sub-data set, to obtain q first sub-data sets respectively corresponding to the q types; and determine the q first sub-data sets as the second data; wherein each of the first sub-data sets comprises one or more first sub-data lines, a line width of each of the first sub-data lines is the same as a bit width of the bus, and q is a positive integer greater than or equal to 1; or
  when the first data comprises the plurality of first data columns and the plurality of first data columns are arranged horizontally in sequence, the controller comprises:
    a sixth sub-controller configured to vertically splice each of the plurality of first data columns based on an order in which the plurality of first data columns are arranged horizontally; and determine data obtained by the vertically splicing as the second data.

9. The apparatus according to claim 8, wherein
  the controller obtains the first data from the accelerator; and/or
  the controller obtains the first data from the storage device.

10. The apparatus according to claim 8, wherein the controller further comprises:
- a third sub-controller configured to, after the plurality of second data lines respectively corresponding to the plurality of first data lines are obtained and for each of the plurality of second data lines, perform operation format conversion on data in the second data line to obtain a fourth data line corresponding to the second data line; and
- a fourth sub-controller configured to perform a splicing process on a plurality of fourth data lines to obtain second target data as the second data, wherein the second target data comprises at least one fifth data line, and a line width of each fifth data line is the same as the bit width of the bus.

11. The apparatus according to claim 8, wherein the controller is further configured to:
- obtain multi-channel data; and
- select at least part of data from the multi-channel data as the first data.

12. The apparatus according to claim 8, wherein the controller comprises a DMA controller.

13. The apparatus according to claim 8, wherein
the storage device comprises a DDR SDRAM,
the programmable device comprises an FPGA, and
the accelerator comprises a CNN accelerator.

14. A data processing system, comprising a storage device and a programmable device, which transmit data to each other via a bus, the programmable device being deployed with a controller and an accelerator, and the controller being enabled with at least two kinds of data format conversion function, wherein the controller is configured to:
- obtain first data, wherein the first data comprises at least one of: a plurality of first data lines, data of q types, or a plurality of first data columns arranged horizontally in sequence;
- perform data format conversion on the first data to obtain second data in a target data format; and
- store the second data to the storage device and/or send the second data to the accelerator;

wherein performing the data format conversion on the first data to obtain the second data in the target data format comprises:
- when the first data comprises the plurality of first data lines, deleting blank data from each of the plurality of first data lines to obtain a plurality of second data lines respectively corresponding to the plurality of first data lines; and performing a splicing process on the plurality of second data lines to obtain first target data as the second data, wherein the first target data comprises at least one third data line, and a line width of each third data line is the same as a bit width of the bus;
- when the first data comprises the data of q types, grouping data of a same type in the first data into a first sub-data set, to obtain q first sub-data sets respectively corresponding to the q types; and determining the q first sub-data sets as the second data; wherein each of the first sub-data sets comprises one or more first sub-data lines, a line width of each of the first sub-data lines is the same as a bit width of the bus, and q is a positive integer greater than or equal to 1; or
- when the first data comprises the plurality of first data columns and the plurality of first data columns are arranged horizontally in sequence, vertically splicing each of the plurality of first data columns based on an order in which the plurality of first data columns are arranged horizontally; and determining data obtained by the vertically splicing as the second data.

* * * * *